(No Model.)

P. W. ALEXANDER.
DRIVING MECHANISM FOR DYNAMOS.

No. 604,511. Patented May 24, 1898.

Witnesses
J. M. Witherow
Chas. E. Brock

Inventor,
Philimon W. Alexander,
by O'Meara & Lee
Attorneys

UNITED STATES PATENT OFFICE.

PHILEMON W. ALEXANDER, OF ALLAPAHA, GEORGIA.

DRIVING MECHANISM FOR DYNAMOS.

SPECIFICATION forming part of Letters Patent No. 604,511, dated May 24, 1898.

Application filed September 21, 1897. Serial No. 652,414. (No model.)

*To all whom it may concern:*

Be it known that I, PHILEMON W. ALEXANDER, residing at Allapaha, in the county of Berrien and State of Georgia, have invented a new and useful Driving Mechanism for Dynamos, of which the following is a specification.

My invention is in the nature of an attachment to railroad-cars whereby the rotation of the axle of the car is utilized for the running of a dynamo located within the car.

The object of my invention is to provide means for running dynamos for electric fans or electric lights in cars not propelled by electricity, said means being in the nature of connections whereby the rotation of the car-axle is communicated to the dynamos.

With this object in view my invention consists in the improved construction, arrangement, and combination of parts hereinafter fully described and afterward specifically pointed out in the claim.

In order to enable others skilled in the art to which my invention most nearly appertains to make and use the same, I will now proceed to describe its construction and operation, reference being had to the accompanying drawings, forming part of this specification, in which—

Figure 1:
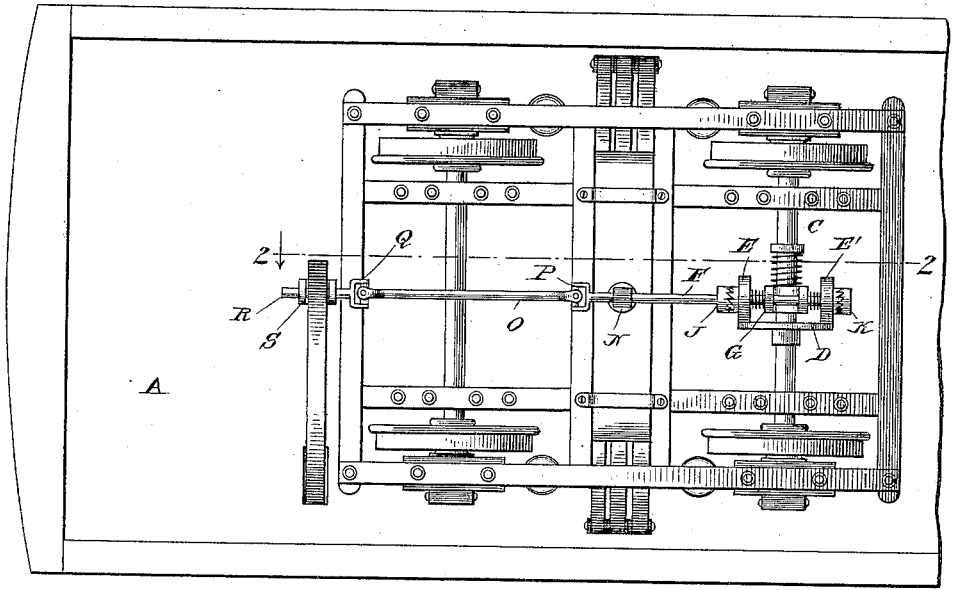
Figure 2:
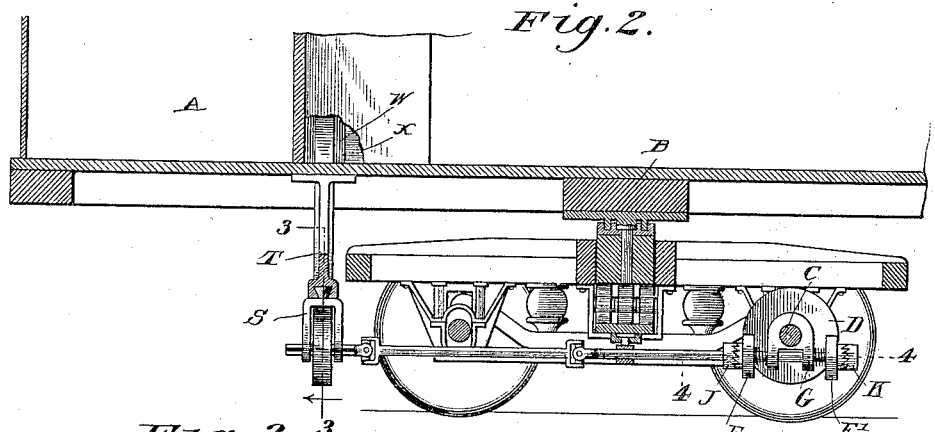
Figures 3, 4:
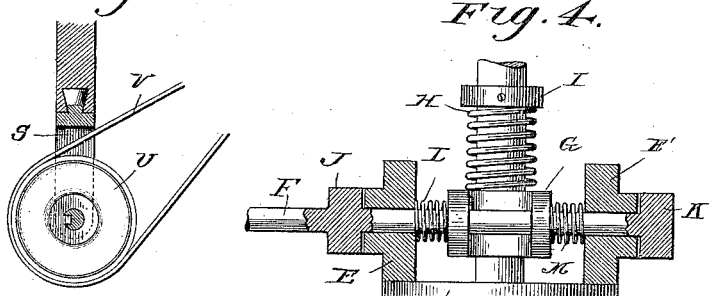

Figure 1 is a bottom plan view of a portion of a car including one truck, my invention being applied thereto. Fig. 2 is a longitudinal section through the same parts on the line 2 2 of Fig. 1, looking in the direction of the arrow. Fig. 3 is a detail vertical sectional view on the line 3 3 of Fig. 2, looking in the direction of the arrow. Fig. 4 is a detail view, partly in bottom plan and partly in section, on the line 4 4 of Fig. 2.

Like letters of reference mark the same parts wherever they occur in the different figures of the drawings.

Referring to the drawings by letter, A is the bottom of a car of any ordinary construction, which car is mounted upon a truck of any approved form, said truck being provided with a king-bolt B, upon which it turns, and the usual axles and wheels, one of said axles being marked C. Upon the axle C is a drive-wheel D, which in this instance is shown as a disk or crown friction-wheel, although a beveled-edge friction-wheel or a crown gear-wheel or a beveled gear-wheel might be substituted therefor, in which case the wheels E and E', which engage therewith and are driven thereby, would be correspondingly changed in construction.

The wheel D is rigidly fixed against either sliding or rotating upon the axle C, and the wheels E E' are loosely mounted upon the longitudinal shaft F, journaled in a bearing G, which is slidably mounted upon the axle and held normally in a position which brings the wheels E E' in contact with the wheel D by means of a spring H, coiled around the axle and having one end bearing against the slidable bearing G and the other end against a collar I, fixed to the shaft.

Rigidly mounted upon the shaft F are clutch-collars J and K, having their teeth pointed in opposite directions. The wheel E is normally kept in engagement with the clutch-collar J by means of a spring L, coiled around the shaft F, bearing at one end against the slidable bearing G and at the other end against the wheel E. The wheel E' is kept normally in engagement with the clutch-collar K by means of a spring M, coiled around the shaft F and having a bearing at one end against the slidable bearing G and at the other end against the wheel E'. The shaft F, near its opposite end, is mounted in a bearing N, depending from the truck in vertical alinement with the king-bolt B. An extension O of the shaft F is attached thereto by means of a universal joint P, and at its outer end is again connected by a universal joint Q with a short farther extension R of the shaft F.

The shaft R is mounted within bearings S, depending from the bottom A of the car, said bearings being vertically swiveled to a bracket T, secured to said bottom.

Between the bearings S is a pulley U, through which the shaft R is splined, so that it may slide therein; but the pulley must rotate with the shaft. A belt V, around this pulley, passes through the opening in the bottom of the car and around the pulley W of the shaft X of a dynamo located in the car, said dynamo being intended for the purpose of supplying current for electric fans and electric lights in the car. (Not herein shown.)

The operation of my device may be described as follows: The car being in motion in either direction, the shaft F will be continuously rotated in one direction. The wheel D, turning with the axle, will drive the wheel E in one direction—we will say to the right, as shown in Fig. 1. The wheel E, rotating in this direction, will engage its teeth with the clutch-collar J and turn the shaft F to the right, the wheel E' in the meanwhile rotating upon the shaft F, its teeth sliding over the teeth of the clutch-collar K. Should the axle C rotate to the left, it will carry the wheel E' to the right, which from the formation of their respective teeth will carry the clutch-collar K, and consequently the shaft F, to to the right, as before stated. In this instance the wheel E will rotate to the left upon the shaft F, its teeth sliding over the teeth of the clutch-collar J.

The shaft F, being journaled in the bearing N directly in vertical alinement with the king-bolt B, will not be affected by the turning of the truck upon the king-bolt while the car is passing around curves; but in order to have a continuous uninterrupted engagement between this shaft and the pulley U, which, as before stated, is mounted in swiveled bearings depending from the bottom of the car, which does not turn with the truck, the sections O and R of the shaft are connected with the shaft F by means of universal joints P and Q, which will compensate for any movement of the truck upon the king-bolt and always serve to drive the pulley U, which in its turn, through the medium of the belt V and pulley W, will drive the shaft X of the dynamo.

The advantages attending the use of my invention will be obvious from the foregoing description. A regular rotation will be given to the dynamo-shaft, effected by the movement of the car, and the power exerted to move the car will be utilized, as before stated, for providing power for running the dynamo, whereby current is furnished for electric lights and electric fans within the car.

While I have illustrated and described the best means now known to me for carrying out my invention, I do not wish to be understood as restricting myself to the exact details of construction shown and described, but hold that any slight changes or variations, such as might suggest themselves to the ordinary mechanic, will properly fall within the limit and scope of my invention.

The wheel D may be made in halves, so that it may be placed upon or removed from the axle without removing the wheels, and other forms than the spiral spring may be used to press upon wheels E E', so that the whole attachment may be adjusted in position without in any wise altering the truck of the car or taking it to pieces.

Having thus fully described my invention, what I claim as new, and desire to secure by Letters Patent of the United States, is—

The combination with the axle having a drive-wheel rigidly secured thereto, with a slidable bearing upon the axle normally held toward the drive-wheel, a shaft mounted in said slidable bearing, clutch-collars rigidly secured to said shaft having teeth pointed in opposite directions, drive-wheels mounted loosely upon said shaft engaging said drive-wheel on opposite sides of the axle and having teeth to engage the clutch-collars respectively, and springs coiled around the shaft between the slidable bearing and the wheels thereon, normally holding the wheels in contact with the clutch-collars, substantially as described.

PHILEMON W. ALEXANDER.

Witnesses:
S. G. SLACK,
C. W. FULWOOD.